(12) United States Patent
Mefford et al.

(10) Patent No.: US 11,230,058 B2
(45) Date of Patent: Jan. 25, 2022

(54) ADDITIVE MANUFACTURING USING LIGHT SOURCE ARRAYS TO PROVIDE MULTIPLE LIGHT BEAMS TO A BUILD MEDIUM VIA A ROTATABLE REFLECTOR

(71) Applicant: THE BOEING COMPANY, Chicago, IL (US)

(72) Inventors: David Keith Mefford, Huntsville, AL (US); Kevin Thomas Slattery, St. Peters, MO (US)

(73) Assignee: THE BOEING COMPANY, Chicago, IL (US)

( * ) Notice: Subject to any disclaimer, the term of this patent is extended or adjusted under 35 U.S.C. 154(b) by 168 days.

(21) Appl. No.: 16/434,806

(22) Filed: Jun. 7, 2019

(65) Prior Publication Data

US 2020/0384688 A1 Dec. 10, 2020

(51) Int. Cl.
*B29C 64/393* (2017.01)
*B29C 64/268* (2017.01)
(Continued)

(52) U.S. Cl.
CPC .......... *B29C 64/268* (2017.08); *B29C 64/135* (2017.08); *B29C 64/209* (2017.08);
(Continued)

(58) Field of Classification Search
CPC ................ B29C 64/268; B29C 64/164; B29C 64/153; B29C 64/20; B29C 64/273;
(Continued)

(56) References Cited

U.S. PATENT DOCUMENTS

| 5,448,265 A * | 9/1995 | Johnson | B41J 2/435 |
| | | | 347/248 |
| 6,866,365 B1 * | 3/2005 | Neese | B41J 19/147 |
| | | | 347/43 |
| 2005/0227186 A1 | 10/2005 | Burgess | |

(Continued)

FOREIGN PATENT DOCUMENTS

| DE | 102014222302 | 5/2016 |
| EP | 3202514 A1 | 1/2017 |

OTHER PUBLICATIONS

Extended European Search Report for Application No. 20166757.3 dated Dec. 3, 2020, 8 pgs.

*Primary Examiner* — Joseph S Del Sole
*Assistant Examiner* — Margaret B Hayes
(74) *Attorney, Agent, or Firm* — Moore IP Law

(57) ABSTRACT

An additive manufacturing system includes a print head, a first light source array, a second light source array, and a controller. The print head includes a first rotatable reflector and a second rotatable reflector. The first light source array is configured to direct multiple first light beams toward a build medium via the first rotatable reflector. The second light source array is configured to direct multiple second light beams toward the build medium via the second rotatable reflector. The controller is coupled to the print head, the first light source array, and the second light source array. The controller is configured to control activation of the first light beams and activation of the second light beams to selectively fuse portions of the build medium to form one or more objects from the build medium.

22 Claims, 5 Drawing Sheets

(51) Int. Cl.
- *B33Y 10/00* (2015.01)
- *B33Y 30/00* (2015.01)
- *B33Y 50/02* (2015.01)
- *B29C 64/209* (2017.01)
- *B29C 64/227* (2017.01)
- *B29C 64/135* (2017.01)

(52) U.S. Cl.
CPC .......... *B29C 64/227* (2017.08); *B29C 64/393* (2017.08); *B33Y 10/00* (2014.12); *B33Y 30/00* (2014.12); *B33Y 50/02* (2014.12)

(58) Field of Classification Search
CPC ................ B29C 64/277; B29C 64/282; B29C 64/286; B29C 64/10; B29C 64/135; B29C 64/393; B33Y 50/02; B22F 10/10; B22F 10/00; B23K 26/00
See application file for complete search history.

(56) References Cited

U.S. PATENT DOCUMENTS

| | | | |
|---|---|---|---|
| 2010/0044353 A1* | 2/2010 | Olsen | B23K 26/38 219/121.67 |
| 2014/0093263 A1* | 4/2014 | Anderson | G03G 15/043 399/51 |
| 2014/0271328 A1 | 9/2014 | Burris et al. | |
| 2015/0165556 A1 | 6/2015 | Jones et al. | |
| 2016/0067827 A1 | 3/2016 | Zediker | |
| 2016/0158889 A1 | 6/2016 | Carter et al. | |
| 2016/0279707 A1 | 9/2016 | Mattes et al. | |
| 2017/0021454 A1 | 1/2017 | Dallarosa et al. | |
| 2017/0021455 A1 | 1/2017 | Dallarosa et al. | |
| 2017/0072463 A1 | 3/2017 | Ng et al. | |
| 2017/0173875 A1 | 6/2017 | Lissotschenko | |
| 2017/0173876 A1 | 6/2017 | Lissotschenko | |
| 2017/0271843 A1 | 9/2017 | Batchelder et al. | |
| 2017/0304894 A1 | 10/2017 | Buller | |
| 2018/0088318 A1* | 3/2018 | Bibas | G02B 26/0816 |
| 2018/0143147 A1* | 5/2018 | Milner | B33Y 99/00 |
| 2018/0161932 A1* | 6/2018 | Ohno | B29C 64/153 |
| 2018/0193955 A1 | 7/2018 | Karp et al. | |
| 2018/0229444 A1 | 8/2018 | Karp et al. | |
| 2018/0236603 A1 | 8/2018 | Carter et al. | |
| 2018/0264551 A1 | 9/2018 | Ishikawa et al. | |
| 2018/0281113 A1 | 10/2018 | Carter et al. | |
| 2018/0339454 A1* | 11/2018 | Franklin | B29C 64/218 |

\* cited by examiner

ADDITIVE MANUFACTURING USING
LIGHT SOURCE ARRAYS TO PROVIDE
MULTIPLE LIGHT BEAMS TO A BUILD
MEDIUM VIA A ROTATABLE REFLECTOR

FIELD OF THE DISCLOSURE

The present disclosure is generally related to additive manufacturing using light source arrays to provide multiple light beams to a build medium via a rotatable reflector.

BACKGROUND

Additive manufacturing enables rapid formation of complex three dimensional objects using various materials, such as metals, ceramics, and polymers. One category of additive manufacturing, sometimes referred to as powder-bed fusion, includes processes that use a powder or other particles as a build medium. Some powder-bed fusion processes form an object by selectively heating regions of the build medium to cause adjacent particles in the heated region to stick to one another to define a portion of the object. Depending on the specific process and characteristics of the build medium, the adjacent particles are sintered together or melted together.

Powder-bed fusion is used for a large variety of materials, including some materials that are difficult for other additive manufacturing processes to work with. However, sintering and melting some of these materials requires relatively hot process conditions, and it can be time consuming to heat selected regions of these materials in the build medium to form the object. As a result, powder-bed fusion is sometimes a slower and/or more expensive process to use than some other additive or conventional manufacturing processes.

SUMMARY

In a particular implementation, an additive manufacturing system includes a print head including a first rotatable reflector and a second rotatable reflector. The additive manufacturing system also includes a first light source array configured to direct multiple first light beams toward a build medium via the first rotatable reflector. The additive manufacturing system further includes a second light source array configured to direct multiple second light beams toward the build medium via the second rotatable reflector. The additive manufacturing system also includes a controller coupled to the print head, the first light source array, and the second light source array. The controller is configured to control activation of the first light beams and activation of the second light beams to selectively fuse portions of the build medium to form one or more objects from the build medium.

In another particular implementation, a system for additive manufacturing includes a print head configured to move with respect to a build structure. The system also includes rotatable reflectors coupled to the print head. The rotatable reflectors are configured to redirect light beams directed at the rotatable reflectors across a build medium on the build structure. The system further includes light source arrays. Each of the light source arrays is configured to direct light beams at a respective rotatable reflector of the rotatable reflectors. The additive manufacturing system also includes a controller coupled to the print head, to each of the light source arrays, and to the rotatable reflectors. The controller is configured to control application of light beams from the light source arrays to the build medium via the rotatable reflectors to control formation of one or more objects from the build medium.

In another particular implementation, a method of additive manufacturing includes controlling, via a controller, a print head drive to move a print head relative to a build structure. The print head includes rotatable reflectors, and each rotatable reflector is configured to redirect multiple light beams directed at the rotatable reflector across a build medium on the build structure. The method also includes controlling, via the controller, activation of light source arrays to direct light beams at the rotatable reflectors as the print head moves, where the rotatable reflectors reflect the light beams toward the build medium to selectively contact the build medium to form a first portion of one or more objects from the build medium. Each light source array is configured to direct a plurality of light beams at a respective rotatable reflector of the rotatable reflectors.

DETAILED DESCRIPTION

Figure 1:
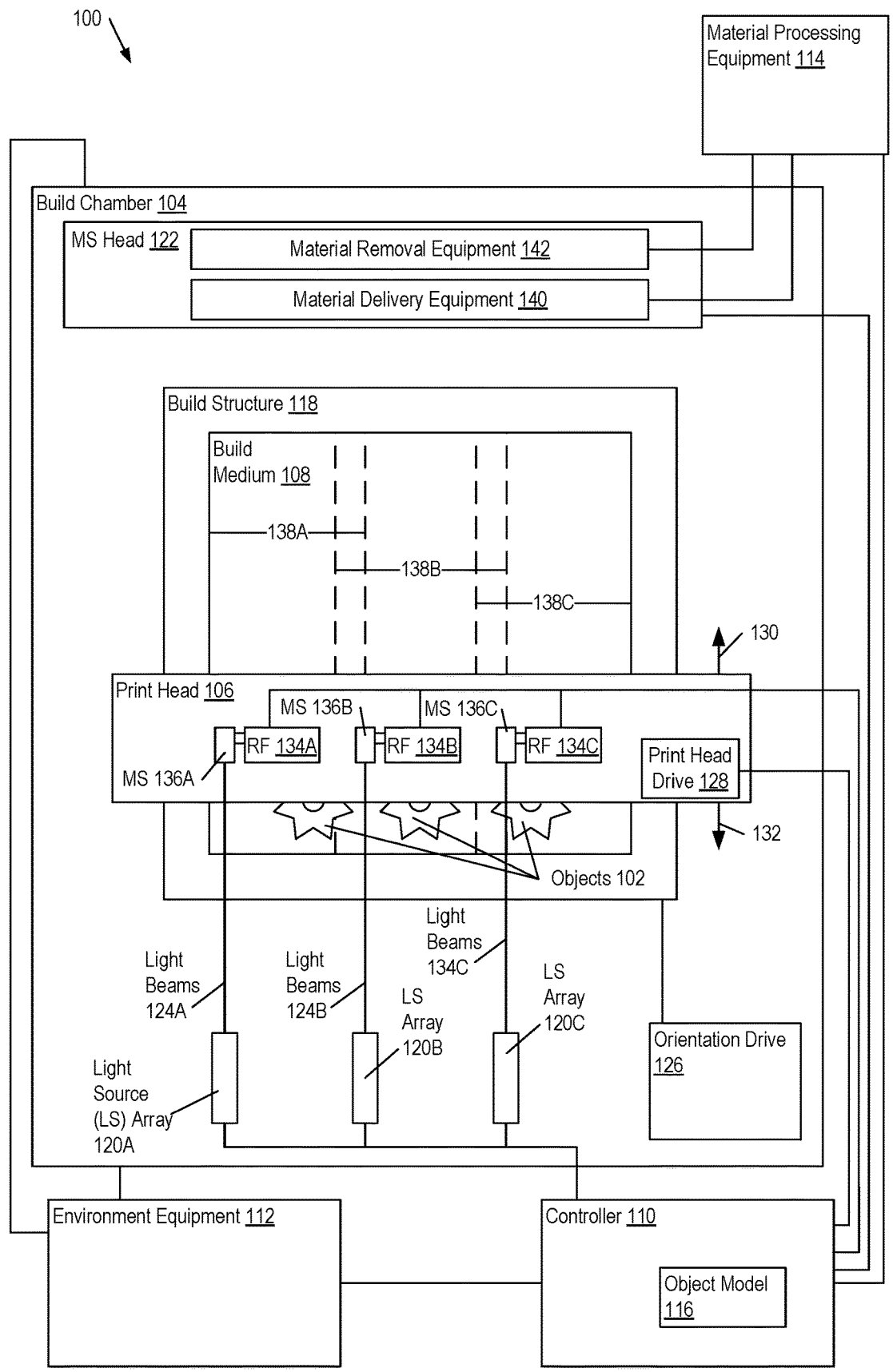
FIG. 1 is a diagram illustrating an example of an additive manufacturing system to form one or more objects.

Systems, apparatuses, methods, and computer-readable mediums disclosed herein are directed to additive manufacturing processes to build one or more objects, layer-by-layer, from a build medium. The additive manufacturing process is performed by an additive manufacturing system, referred to herein as a three-dimensional (3D) printer. The 3D printer includes a plurality of light source arrays. Additionally, the 3D printer includes a print head that includes a plurality of rotatable reflectors. Each rotatable reflector is associated with one of the light source arrays. Each of the light source arrays includes multiple independently controllable light sources (e.g., activation of a particular light source of a light source array does not depend on an activation status of one or more other lights sources of the light source array).

During operation, the 3D printer selectively activates the lights sources of a light source array to direct light beams from the light sources at selected portions of the build medium. The light sources of a particular light source array are selectively activated based on the rotary position of a rotatable reflector associated with the particular light source array and based on the position of the print head. In some circumstances, more than one light source of a light source array is active at a particular time. In particular implementations, the light beams generated by two or more active light sources have different properties, such as different power levels, different pulse lengths, different duty cycles, different wavelengths, etc. In other implementations, two or more active lights sources have the same or substantially the same properties. For example, light beams from two light sources of a light source array are used to heat build medium, and the two light beams have the same, or substantially the same, power levels, pulse lengths, duty cycles, wavelengths, etc. Additionally, due to positional offsets between the two or more active light sources, the light beams are directed to different portions of a build medium of the 3D printer. As a result, the different light beams are used to perform different functions than one another during a single build pass of the print head. For example, as the print head moves relative to the build medium, a first light beam pre-heats a portion of the build medium and a second light beam (simultaneously or concurrently) fuses a portion of the build medium that was previously pre-heated by the first light beam.

In some implementations, the lights source arrays are separate from the print head. For example, the rotatable reflectors are mounted on the print head and the light source arrays are mounted on a frame or other structure of the 3D printer and aimed toward the rotatable reflectors. Each light source array includes multiple light sources. Some implementations of the 3D printer include optical features (such as one or more mirror or optical fibers) to facilitate aiming a light source array toward a rotatable reflector. Disposing the light source arrays off of the print head simplifies and reduces the weight of the print head and equipment coupled to and moved by the print head during a build pass. For example, if the light source arrays were coupled to the print head, the print head would be coupled to power and control wiring for each light source, and the power and control wiring would have to be moveable with the print head, increasing the size, weight, and complexity of the print head. Generally, it is expected that a lighter print head is controllable with finer granularity, with better accuracy and precision, and with lower cost actuators, than a heavier print head.

Further, disposing the light source arrays off of the print head positions the light source arrays further from environmental conditions associated with the additive manufacturing process. For example, light beams generated by the light source arrays are used to sinter or melt the build medium to form an object. As a result, in some implementations, temperatures in some portions of the 3D printer are high during the additive manufacturing process. Additionally, in some circumstances, portions of the build medium are vaporized, off gas other materials, or both. The light source arrays that are positioned off of the print head are therefore subjected to less extreme conditions (e.g., lower temperature and less gas/vapor exposure) than light sources mounted on the print head. Because of the less extreme conditions, lower cost light sources are usable, and the useful lifetime of each light source is increased.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features referred to herein as a group or a type are (e.g., when no particular one of the features is being referenced), the reference number is used without a distinguishing letter. However, when one particular feature of multiple features of the same type is referred to herein, the reference number is used with the distinguishing letter. For example, referring to FIG. 1, light source arrays 120A, 120B, and 120C are shown. When referring to a particular one of these light source arrays, such as the light source array 120A, the distinguishing letter "A" is used. However, when referring to any arbitrary one of these light source arrays or to these light source arrays as a group, the reference number 120 is used without a distinguishing letter.

Particular aspects of the disclosure are described with reference to the drawings. In the description, common features are designated by common reference numbers throughout the drawings. As used herein, various terminology is used for the purpose of describing particular implementations only and is not intended to be limiting. For example, the singular forms "a", "an", and "the" are intended to include the plural forms as well, unless the context clearly indicates otherwise. It may be further understood that the terms "comprise", "comprises", and "comprising" may be used interchangeably with "include", "includes", or "including". Additionally, it will be understood that the term "wherein" may be used interchangeably with "where." As used herein, an ordinal term (e.g., "first", "second", "third", etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

FIG. 1 is a diagram illustrating an example of an additive manufacturing system 100 to form one or more objects 102. The additive manufacturing system 100 includes a build chamber 104 and a print head 106 within the build chamber 104. The one or more objects 102 are formed from a build medium 108, such as a metal, metal alloy, ceramic, polymer, or combinations thereof. In some implementations, to form the one or more objects 102, the additive manufacturing system 100 selectively fuses portions of the build medium 108, such as by using one or more processes including, but not limited to, sintering the build medium 108 to form solid material, melting and solidifying the build medium 108 to form solid material, and reacting component compounds of the build medium 108 to form solid material. In other implementations, the build medium 108 includes a liquid, and the additive manufacturing system 100 selectively hardens portions of the liquid by exposure to light.

In FIG. 1, the additive manufacturing system 100 includes the build chamber 104, the print head 106, a controller 110, environment equipment 112, and material processing equipment 114. An additive manufacturing process to form the one or more objects 102 is performed within the build chamber 104. The controller 110 includes one or more computer systems (e.g., one or more processors and one or more memory devices) that control formation of the one or more objects 102 in the build chamber 104 during the additive manufacturing process. In FIG. 1, the controller 110 includes an object model 116 of the one or more objects 102 to be formed by the additive manufacturing process. In other implementations, the controller 110 accesses the object model 116 from another computing device or receives machine instructions (e.g., G-code) based on the object model 116 from the other computing device. Although three objects 102 are illustrated in FIG. 1, the additive manufacturing system 100 is usable to concurrently form more than three objects 102 or fewer than three objects 102.

The object model 116 is a three-dimensional (3D) model of object 102 or of all three of the objects 102. The additive manufacturing system 100 forms the one or more objects 102 using a layer-by-layer process. The object model 116 defines the layers (also referred to as "slices") used to form the objects 102. In some implementations, the object model 116 does not define the layers, in which case the controller or another computing device executes a slicer application to define the layers. The controller 110 uses the object model 116 to determine which particular portions of the build medium 108 should be fused to form a layer of the one or more objects 102 on each build pass of the print head 106 over the build medium 108. In some implementations, the object model 116 is a computer aided design (CAD) compatible file. For example, the file is an STL-formatted file, a 3D manufacturing format (3MF) file, an additive manufacturing file (AMF) file, or other type of file usable to describe a three-dimensional object. In other implementations, the object model 116 is an output file of a slicer application, in which case the object model 116 includes machine instructions, such as G-code.

The environment equipment 112 is configured to establish and maintain environmental conditions within the build chamber 104. In some implementations, the environment equipment 112 includes, for example, computer systems, sensors, vacuum pumps, gas supply lines, gas removal lines, heating elements, cooling elements, one or more filters, other equipment, or combinations thereof. In a particular implementation, the controller 110 is coupled to the environment equipment 112 to provide control signals. For example, the controller 110 sends one or more first commands to the environment equipment 112 to establish particular environmental conditions in the build chamber 104 before initiation of the additive manufacturing process. In particular implementations, the environmental conditions include, for example, a vacuum environment, an inert gas environment to inhibit oxidation or undesired reactions during and after fusing of the build medium 108, or both. The environmental conditions may also include a specified temperature or temperature range. In some implementations, the environment equipment 112 includes sensors that provide feedback signals to the controller 110. For example, the sensors include one or more temperature sensors to detect a temperature within the build chamber 104, one or more pressure sensors to detect a pressure within the build chamber 104, one or more chemical sensors to detect presence of or a concentration of particular chemicals within the build chamber 104, etc. The environment equipment 112, the controller 110, or both, are able to maintain or modify the environmental conditions in the build chamber 104 during the additive manufacturing process utilizing one or more process control systems. A user, the controller 110, another computing device specify the environmental conditions. For example, the environmental conditions are specified based on properties of the build medium 108, such as based on a sintering temperature of the build medium 108, based on a melting point of the build medium 108, based on gases that the build medium 108 emits when heated, based on chemicals that the build medium 108 reacts with when heated, etc.

The material processing equipment 114 processes and handles the build medium 108. For example, the material processing equipment 114 includes material storage containers for the build medium 108 (or build media), transport equipment (e.g., conveyors, augers, vacuum systems, etc.) to move build medium 108 into or out of the build chamber 104, filters, computer systems, sensors, other equipment, or combinations thereof. In a particular implementation, the controller 110 is coupled to the material processing equipment 114 to provide control signals to the material processing equipment 114, to receive data from the material processing equipment 114, or both. For example, the controller 110 sends one or more second commands to the material processing equipment 114 to cause the material processing equipment 114 to supply the build medium 108 to the build chamber 104 before and during the additive manufacturing process. In some implementations, after completion of the additive manufacturing process, the controller 110 sends one or more third commands to the material processing equipment 114 to initiate a recovery process that cleans (e.g., filters) and recycles build medium 108 supplied to the build chamber 104 that was not fused to form the one or more objects 102.

In FIG. 1, a build structure 118, the print head 106, light source arrays 120, a material system head 122 ("MS Head" in FIG. 1), and an orientation drive 126 are disposed within the build chamber 104. Three light source arrays 120, including a first light source array 120A, a second light source array 120B, and a third light source array 120C, are depicted in FIG. 1. In other implementations, the additive manufacturing system 100 includes fewer than three light source arrays 120 or more than three light source arrays 120. Each of the light source arrays 120 includes multiple, independently controllable, light sources, as described further below. For example, each light source array 120 includes two or more diode lasers, fiber lasers, other types of lasers, or a combination thereof. Although FIG. 1 illustrates the light source arrays 120 as disposed within the build chamber 104, in other implementations, light sources of each light source array 120 are disposed outside the build chamber 104. In such implementations, the light source arrays 120 includes optics (e.g., fold mirrors or optical fibers) to direct and aim light beams 124 toward the print head 106.

The build structure 118 includes a platform or container to support the build medium 108 and the one or more objects 102. In some implementations, the build structure 118 is stationary during the additive manufacturing process. In other implementations, one or more actuators are coupled to the build structure 118 and the build structure 118 is moveable during the additive manufacturing process. For example, in FIG. 1, the additive manufacturing system 100 includes an orientation drive 126 coupled to the build structure 118. The orientation drive 126 includes an actuator that is configured to change an orientation of the build structure 118 with respect to the print head 106. In some implementations, an elevation actuator (not shown) is coupled to the build structure 118 and configured to adjust a vertical distance between the build structure 118 and the print head 106 during the additive manufacturing process. For example, after a particular layer of the objects 102 is formed, a layer of the build medium 108 is added over the particular layer of the objects 102 and the build structure 118 is moved downward (away from the print head 106) by a distance approximately equal to a thickness of the added layer of build medium such that the distance between the print head 106 and an upper surface of the build medium 108 remains relatively constant throughout the additive manufacturing process.

The print head 106 includes or is coupled to a print head drive 128. The print head drive 128 includes an actuator to move the print head 106 relative to the build structure 118. For example, the print head drive 128 moves the print head 106 in a first direction 130 relative to the build structure 118. Additionally, the print head drive 128 is able to move the print head 106 in a second direction 132 that is opposite to the first direction 130. In some implementations, the print head drive 128 includes an encoder or other sensor to provide position information to the controller 110 indicating a position of the print head 106 relative to the build structure 118 (e.g., an offset distance of the print head 106 from a home position or another registration position of the print head 106).

The print head 106 includes multiple rotatable reflectors 134 ("RF" in FIG. 1), including a first rotatable reflector 134A, a second rotatable reflector 134B, and a third rotatable reflector 134C. Although three rotatable reflectors 134 are illustrated in FIG. 1, in other implementations the print head 106 includes more than three rotatable reflectors 134 or fewer than three rotatable reflectors 134. For example, the print head includes a single rotatable reflector 134 in a particular implementation. Each rotatable reflector 134 is configured to redirect one or more light beams 124 from one of the light source arrays 120 across a portion of the build medium 108. For example, each of the rotatable reflectors 134 includes multiple facets, faces, sides, or bevels, each including a mirrored surface. FIGS. 3-6 illustrate one particular example of a rotatable reflector 134

In the implementation illustrated in FIG. 1, the print head 106 includes multiple mirror systems 136 ("MS" in FIG. 1), including a first mirror system 136A, a second mirror system 136B, and a third mirror system 136C. In this implementation, the mirror systems 136 cooperate with the rotatable reflectors 134 to steer the light beams 124 toward targeted portions of the build medium 108. In other implementations, the mirror systems 136 are omitted and other steering optics are used to direct the light beams 124 toward the rotatable reflectors 134. In yet other implementations, the print head 106 includes more mirror systems 136 than rotatable reflectors 134. For example, each rotatable reflector 134 is associated with two mirror systems 136. To illustrate, one mirror system 136 is positioned on a first side of a rotatable reflector 134 and another mirror system is be positioned on an opposite side of the rotatable reflector 134. In such implementations, two light source arrays 120 are associated with a single rotatable reflector 134 such that one of the light source arrays 120 directs light beams 124 toward the first side of the rotatable reflector 134 and another of the light source arrays 120 directs light beams 124 toward the opposite side of the rotatable reflector 134.

The rotatable reflectors 134 include or correspond to polygon mirrors, mirror galvanometers, piezoelectric micromirror devices, or other beam redirection devices. Additionally, each rotatable reflector 134 includes or is coupled to an actuator, such as a rotary motor or a galvanometer, that is configured to move (e.g., to rotate) the rotatable reflector 134. When rotating, each rotatable reflector 134 is configured to redirect light beams 124 from one or more of the light source arrays 120 across a respective path 138. For example, the rotatable reflector 134A is configured to redirect light beams 124A across a first path 138A, the rotatable reflector 134B is configured to redirect light beams 124B across a second path 138B, and the rotatable reflector 134C is configured to redirect light beams 124C across a third path 138C. Generally, adjacent paths 138 overlap such that some portions of the build medium 108 are accessible by light beams 124 reflected from two of the rotatable reflectors 134.

In particular implementations, the controller 110 synchronizes a rotation rate of the rotatable reflectors 134. In other implementations, each of the rotatable reflectors 134 is coupled to or includes an encoder or another sensor that provides position feedback to the controller 110 indicating the rotation rate of the rotatable reflectors 134. Each of the rotatable reflectors 134 redirect light beams 124 from a respective light source array 120 across a particular path 138 onto the build medium 108 as the print head 106 moves relative to the build medium 108.

The rotatable reflectors 134, the print head drive 128, the mirror systems 136, or a combination thereof, are coupled to the controller 110 and configured to send signals to and/or receive signals from the controller 110. For example, the controller 110 sends control signals to the rotatable reflectors 134 to control a rotation rate of the rotatable reflectors 134. As another example, the controller 110 receives sensor data signals from the rotatable reflectors 134 indicating angular positions and/or rotation rates of the rotatable reflectors 134. In a particular implementation, the rotatable reflectors 134 provide angular position data to the controller 110, and the controller 110 uses the angular position data from each of the rotatable reflectors 134 to target the light beams 124 at selected portions of the build medium 108 as the print head 106 moves across the build medium 108. In this example, the controller 110 activates individual light sources of the light source arrays 120 to generate light beams 124 at specific times such that the light beams 124 are directed to the selected portion of the build medium 108.

As another example, the controller 110 sends control signals to the print head drive 128 to initiate and control movement of the print head 106 relative to the build structure 118. In this example, the controller 110 controls a rate of travel and a direction of travel of the print head 106 relative to the build structure 118. In some examples, the print head drive 128 provides signals including or indicating position data for the print head 106 to the controller 110. The controller 110 uses information indicating the angular position of each rotatable reflector 134 (e.g., angular position data), information indicating the position of the print head 106 (e.g., position data), and the object model 116, to activate particular light sources of the light source arrays 120 at particular times to form portions of the objects 102.

In some implementations, each light source array 120 includes light sources that produce light beams 124 with different characteristics. The different characteristics of the light beams 124 produced by light sources of one light source array 120 include, for example, different power levels, different focal widths, different wavelengths, different pulse widths, different duty cycles, or differences in other characteristics. In such implementations, each of the light beams 124 directed to the build medium 108 by the light sources of a particular light source array 120 are configured to perform particular functions. In a particular implementation, a first particular light beam from a first light source of the light source array 120A has characteristics selected to heat a targeted portion of the build medium 108 to a particular temperature near a first target temperature (e.g., near a sintering temperature or near a melting temperature) of the build medium 108. In some circumstances, raising the temperature near the first target temperature reduces thermal stresses formed in the one or more objects 102 when the build medium 108 is subsequently fused.

In the particular implementation, a second particular light beam from a second light source of the light source array 120A has characteristics selected to raise the temperature of the targeted portion of the build medium 108 to or above the first target temperature. A third particular light beam from a third light source of the light source array 120A has characteristics selected to provide additional heat to maintain the targeted portion of the build medium 108 at or above the first target temperature for a threshold time period. A fourth particular light beam from a fourth light source of the light source array 120A has characteristics selected to vaporize a portion of the build medium 108 to trim an edge of one of the objects 102 after the temperature falls below the first target temperature. In other implementations, the light beams 124 from the light sources of the light source arrays 120A are used in other manners. For example, two light beams 124A from two light sources of the light source array 120A are used to pre-heat the build medium 108. In other embodiments, each of the light source arrays 120 includes fewer than four light sources or more than four light sources.

In particular implementations, the material system head 122 sends signals to the controller 110, receives signals from the controller 110, or both. As an example, the material system head 122 receives control signals from the controller 110 to cause the material system head 122 move relative to the build structure 118. In FIG. 1, the material system head 122 includes material delivery equipment 140 and material removal equipment 142. In some implementations, the material delivery equipment 140 and the material removal equipment 142 are coupled to different drive heads instead of the material system head 122. For example, the material delivery equipment 140, the material removal equipment 142, or both, are coupled to the print head 106. In some implementations, the material removal equipment 142 is omitted.

When the material delivery equipment 140 is coupled to the print head 106, the print head drive 128 is activated by the controller 110 to move the print head 106 from a first position to a second position and to apply a layer of the build medium 108 on the build structure 118. Subsequently, the print head drive 128, the rotatable reflectors 134, and the light source arrays 120 are activated by the controller 110, and the print head drive 128 moves the print head 106 from the second position to the first position to selectively apply the light beams 124 from the light source arrays 120 to the build medium 108 to form a layer of one or more of the objects 102.

Before starting the additive manufacturing process or after each build pass of the print head 106 (e.g., each pass of the print head 106 that builds a layer of one or more of the objects 102), the controller 110 engages the material system head 122 to move across the build structure 118 to cause the material delivery equipment 140 to apply a layer of the build medium 108 to the build structure 118. In some implementations, the material delivery equipment 140 includes containers filled with material (e.g., the build medium 108) supplied from the material processing equipment 114, transport equipment, levelers (e.g., rollers, blades, brushes, other leveling equipment, or combinations thereof), a height sensor, and other components.

After the additive manufacturing process is completed, the controller 110 engages the material system head 122 to move across the build structure 118 to remove excess build medium 108 (e.g., portions of the build medium 108 that are not fused to form the objects 102) from the build structure 118. For example, the material removal equipment 142 includes a vacuum system to remove the excess build medium 108. After the material removal equipment 142 removes the excess build medium 108, the build chamber 104 is opened and the one or more objects 102 are removed for further processing (e.g., cleaning, surface treatment, etc.) and use.

During the additive manufacturing process, layers of the objects 102 are formed from different directions to control or improve physical properties of the one or more objects 102 produced by the additive manufacturing process. For example, the controller 110 engages the orientation drive 126 after a build pass of the print head 106 across the build medium 108 to change an orientation of the print head 106 relative to the build structure 118. For example, in FIG. 1, the orientation drive 126 is coupled to the build structure 118 and configured to rotate the build structure 118 relative to the print head 106. After a build pass of the print head 106, or after a particular number of build passes of the print head 106, the controller 110 activates the orientation drive 126 to rotate the build structure 118 a specified number of degrees (e.g., 30 degrees, 45 degrees, 90 degrees, or some other number of degrees specified by the controller 110) to change a direction of movement of the print head 106 with respect to the build structure 118. In such implementations, the controller 110 determines an activation sequence of the light source arrays 120 based on the new orientation for a next layer of the one or more objects 102.

In another example, activation of the orientation drive 126 by the controller 110 causes the print head 106 to be repositioned (e.g., rotated by a specified number of degrees). In this example, the light source arrays 120 are coupled to and move with the print head 106. Alternatively, the light source arrays 120 are repositioned by another system (not shown) relative to the new orientation of the print head 106, or a second set of light source arrays that are positioned for use when the print head 106 is in the new orientation are used. The controller 110 uses the new orientation to determine a sequence of light beams 124 to apply to the build medium 108.

In a particular example of operations, the additive manufacturing system 100 initiates a build process in response to input from a user or input from a computing device. When the additive manufacturing system 100 initiates the build process, the material processing equipment 114 acquires the build medium 108 from a storage container. In some implementations, the user or the computing device causes the build medium 108 to be provided to the material processing equipment 114. Additionally, the object model 116, or machine instructions (e.g., G-code) based on the object model 116, is provided to the controller 110 from the computing device via a computer-readable medium or via a network connection.

If the build process is to be performed in controlled environmental conditions, the controller 110 sends commands to the environment equipment 112 to establish desired environmental conditions in the build chamber 104. The controller 110 also sends commands to the material processing equipment 114 to provide the build medium 108 to the material delivery equipment 140, if needed. The controller 110 sends a command to the material system head 122 and the material delivery equipment 140 to apply a first layer of the build medium 108 to the build structure 118. In some implementations, the controller 110 sends a command to the print head drive 128 to move the print head 106 to a home position (e.g., a starting position) relative to the build structure 118 and sends commands to activate the light source arrays 120, the rotatable reflectors 134, or both.

Before a build pass of the print head 106 across the build medium 108, the controller 110 determines (or receives from a computing device) an activation sequence (or activation timing) for the light source arrays 120 as a function of angular rotation of the rotatable reflectors 134 and as a function of the position of the print head 106. In some implementations, the activation sequence (or activation timing) is also determined based on the physical properties of the build medium 108 (e.g., the sintering temperature or melting temperature of the build medium 108, heat transfer characteristics of the build medium 108, etc.), based on desired properties of the objects 102, or combinations thereof. In a particular example, the activation sequence of the light source arrays 120 along with information about the rotation of the rotatable reflectors 134 and the position of the print head 106 define a tool path of the light beams 124 to form the objects 102. In this context, a "tool path" refers to a path, on a surface of the build medium 108, traced by the light beams 124 to fuse portions of the build medium 108 in a desired configuration to form the one or more objects 102.

After determining the activation sequence for the light source arrays 120, the controller 110 engages the print head drive 128 to move the print head 106 with respect to the build medium 108. While the print head drive 128 moves the print head 106, the controller 110 receives angular position data indicating angular positions of reflective surfaces of the rotatable reflectors 134 and position data indicating a travel distance (or other indication of the position) of the print head 106 across the build medium 108. Based on the angular position data and the position data, the controller 110 implements the activation sequence for the light source arrays 120.

After the build pass, the controller 110 determines if a subsequent build pass is to be performed. If another build pass is to be performed, the controller 110 activates the material system head 122, the material processing equipment 114, the material delivery equipment, 184 or combinations thereof, to apply another layer of the build medium 108. In some implementations, the controller 110 also causes the build structure 118 or the print head 106 to be repositioned vertically to maintain an approximately consistent distance between the print head 106 and an upper surface of the build medium 108. The controller 110 changes the orientation of the print head 106 relative to the build structure 118, if needed. Alternatively, or in addition, the controller 110 repositions the print head 106 at an initial position (e.g., the home position), and perform the subsequent build pass as described above.

If no subsequent build pass is to be performed, the controller 110 activates the environment equipment 112 to return the build chamber 104 to ambient conditions. For example, the environment equipment 112 flushes the build chamber 104 with cooling air to decrease the temperature in the build chamber 104 and to remove process gases and gaseous and particulate byproducts of the build process. In some implementations, the controller 110 also activates the material system head 122, the material processing equipment 114, the material removal equipment 142, or combinations thereof, to separate the objects 102 from portions of the build medium 108 that were not used to form the objects 102. After environmental conditions within the build chamber 104 are satisfactory, after the objects 102 are separated from the excess build medium 108, or after other safety or process conditions are satisfied, the build chamber 104 is opened and the objects 102 are removed.

Figure 2:
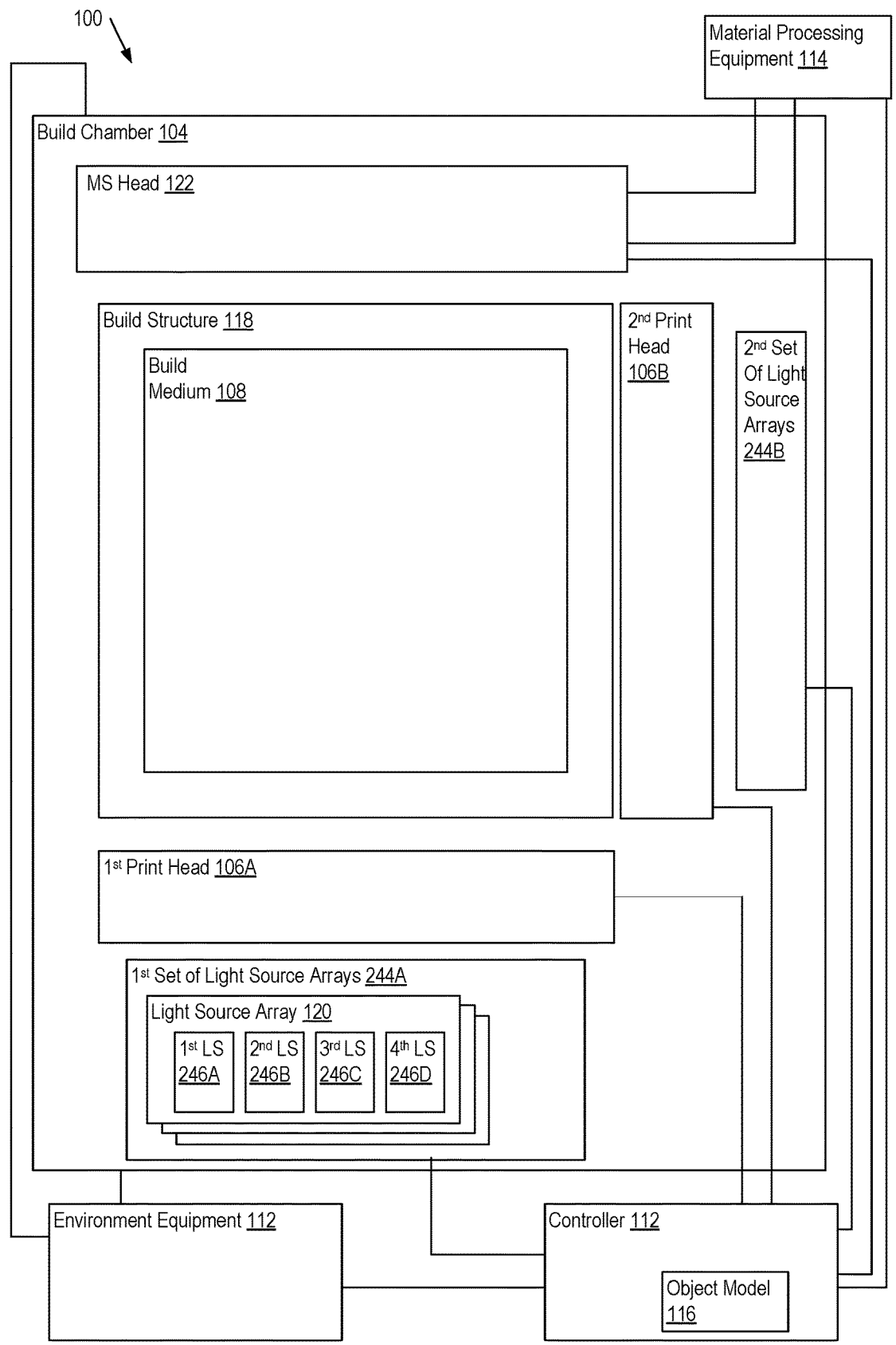
FIG. 2 is a diagram illustrating another example of the additive manufacturing system of FIG. 1.

FIG. 2 is a diagram illustrating another example of the additive manufacturing system 100 of FIG. 1. In FIG. 2, the additive manufacturing system 100 includes two or more print heads 106 with different directions of movement, including a first print head 106A and a second print head 106B. Having two or more print heads 106 simplifies control of the direction from which the light beams 124 are applied to the build medium 108 without use of the orientation drive 126 of FIG. 1. In FIG. 2, the second print head 106B is at a different orientation (e.g., orthogonal) relative to the first print head 106A.

In FIG. 2, the first print head 106A is configured to direct light beams from a first set of light source arrays 244A toward targeted portions of the build medium 108. Similarly, the second print head 106B is configured to direct light beams from a second set of second light source arrays 244B toward targeted portions of the build medium 108. The first print head 106A and the second print head 106B each include features and components as described with respect to the print head 106 of FIG. 1.

FIG. 2 also illustrates a light source array 120, which includes multiple, independently controllable light sources 246 ("LS" in FIG. 2). In the example illustrated, the light sources 246 include a first light source 246A, a second light source 246B, a third light source 246C, and a fourth light source 246D. In other implementations, each light source array 120 includes more than four light sources 246 or fewer than four light sources 246. Further, two or more of the light sources 246 of a light source array 120 can be different from one another. For example, a light source array 120 includes one light source (such as the first light source 246A) configured to generate a relatively low power light beam and includes another light source (such as the second light source 246B) configured to generate a higher power light beam. As another example, a light source array 120 includes one light source (such as the first light source 246A) configured to generate a light beam having a first wavelength (or a first range of wavelengths) and includes another light source (such as the second light source 246B) configured to generate a light beam having a different wavelength (or a different range of wavelengths). As still another example, a light source array 120 includes one light source (such as the first light source 246A) configured to generate a pulsed light beam having a first pulse width and a first duty cycle and includes another light source (such as the second light source 246B) configured to generate a non-pulsed light beam or a pulsed light beam having a different pulse width, a different duty cycle, or both.

In particular implementations, the first print head 106A and the second print head 106B share one or more components of the additive manufacturing system 100 to reduce a number of components of the additive manufacturing system, to reduce a cost of building the additive manufacturing system 100, or both. For example, the print head 106A and 106B each utilize the same light sources 246. A positioning system moves the light sources 246 to appropriate locations. For example, the positioning system is a robotic arm coupled to the light sources 246 that moves the light sources 246 from a first position in working relation to the first print head 106A to a second position in working relation to the print head 106B. Using the same light sources 246 for multiple print heads 106 reduces the number of components of the additive manufacturing system 100 and reduces the cost of manufacturing the additive manufacturing system 100.

Figure 3:
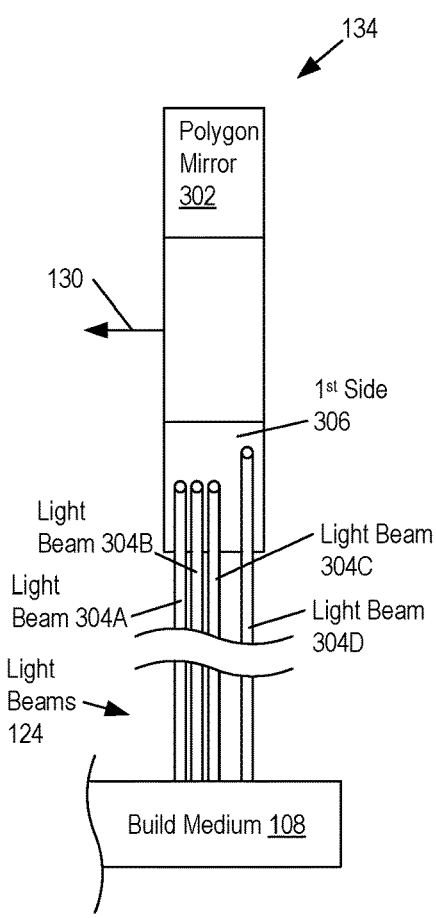
FIG. 3 depicts a side view of a polygon mirror portion of a rotatable reflector at a first particular time.
Figure 4:
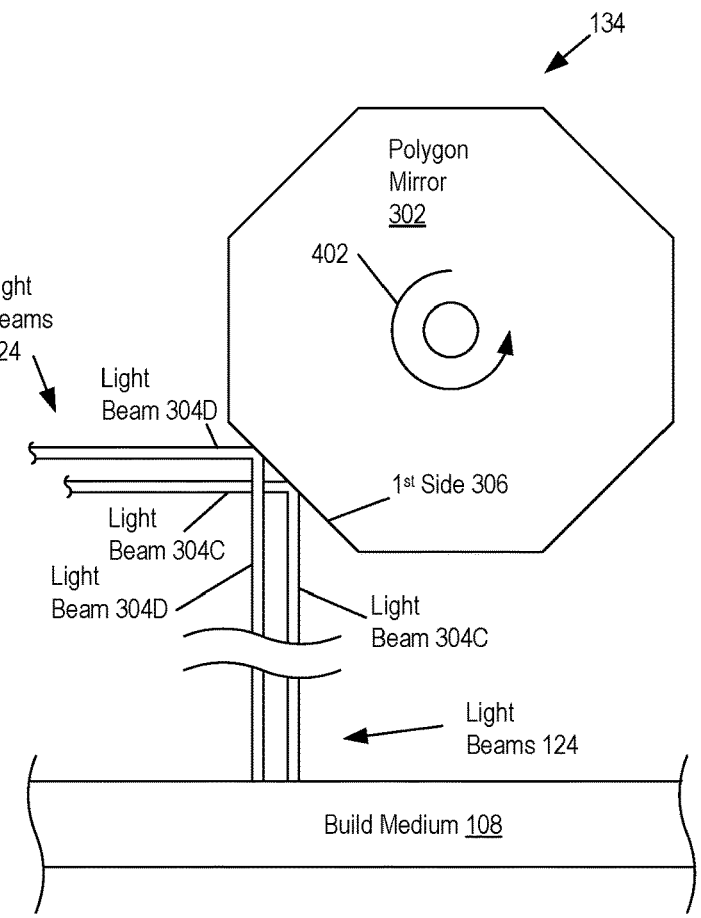
FIG. 4 depicts a front view of the polygon mirror portion depicted in FIG. 3 at the first particular time.
Figure 5:
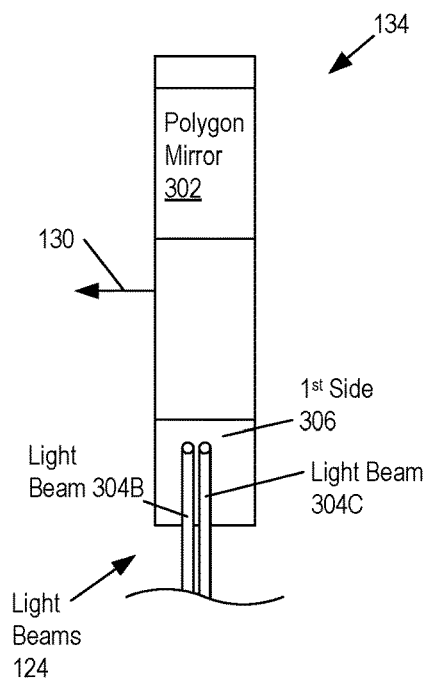
FIG. 5 depicts a side view of the polygon mirror portion depicted in FIG. 3 at a second particular time.
Figure 6:
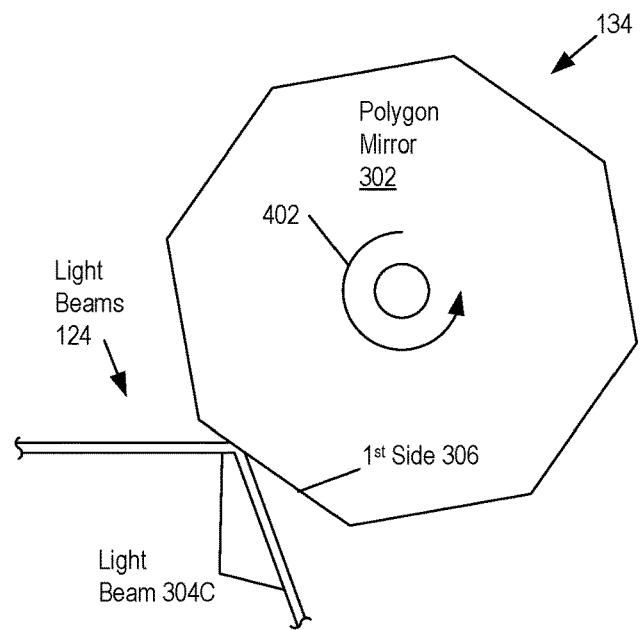
FIG. 6 depicts a front view of the polygon mirror portion depicted in FIG. 5 at the second particular time.

FIGS. 3-6 depict various views of a polygon mirror 302, which is a component of or corresponds to one of the rotatable reflectors 134 of FIG. 1. FIG. 3 depicts a side view of the polygon mirror 302 at a first particular time during an additive manufacturing process, and FIG. 4 depicts a front view of the polygon mirror 302 at the first particular time. Similarly, FIG. 5 depicts a side view of the polygon mirror 302 at a second particular time during the additive manufacturing process, and FIG. 6 depicts a front view of the polygon mirror 302 at the second particular time. FIGS. 3 and 4 show the polygon mirror 302 redirecting light beams 124 to the build medium 108. FIGS. 3 and 5 also show the first direction 130 of movement of the print head 106 according to a particular implementation.

In FIG. 3, the polygon mirror 302 has eight reflective sides and rotates in a counterclockwise direction, as indicated by a rotation indicator 402 of FIG. 4. In other implementations, the polygon mirror 302 has fewer than eight sides or more than eight sides. Further, in some implementations, the polygon mirror 302 rotates in a clockwise direction, or the counterclockwise direction at some times and in the counterclockwise direction at other times.

At the first particular time represented in FIGS. 3 and 4, several of the light sources 246 of a light source array 120 are on and directing light beams 124 toward the polygon mirror 302. At the first particular time, the light beams 124 directed toward the polygon mirror 302 include a first light beam 304A, a second light beam 304B, a third light beam 304C, and a fourth light beam 304D. In the example illustrated in FIGS. 3 and 4, the first, second, and third light beams 304A-304C are approximately co-planar and the fourth light beam 304D is out of plane with (e.g., higher than) the first, second, and third light beams 304A-304C. In other implementations, the light beams 124 generated by a light source array 120 are all coplanar or in other non-coplanar arrangements. In this context, coplanar refers to each of the light beams 124 contacting the polygon mirror 302 at the same vertical distance from a center of the polygon mirror 302. In some implementations, a different arrangement of co-planar and out-of-plane light beams 124 are generated, or none of the light beams 124 is co-planar with another of the light beams 124 (e.g., the light beams 124 are staggered). As long as the path of each light beam 124 toward the polygon mirror 302 is consistent, the controller 110 accounts for differences in the direction of each light beam 124 as it contacts the polygon mirror 302.

In FIGS. 3 and 4, the light beams 124 contact a first side 306 of the polygon mirror 302. As the polygon mirror 302 rotates, an incidence angle of the light beams 124 at the first side 306 changes. The change of incidence angle causes a corresponding change of the reflection angle of each of the light beams 124, which has the effect of redirecting the light beams 124 across the surface of the build medium 108. The controller 110 controls the rate of rotation of the polygon mirror 302, a rotation angle of the polygon mirror 302, which light sources 246 are active and generating light beams 124, or a combination of these, to direct the light beams 124 to targeted portions of the build medium 108.

FIGS. 5 and 6 represent a second particular time during the additive manufacturing process, where the second particular time is subsequent to the first particular time represented in FIGS. 3 and 4. Relative to FIGS. 3 and 4, at the second particular time, the polygon mirror 302 has rotated several degrees. Additional, the controller 110 has deactivated light sources 246 associated with the first light beam 304A and the fourth light beam 304D. Due to the rotation of the polygon mirror 302, the incidence angle of the light beams 124 at the first side 306 is different than (e.g., greater than) the incidence angle represented in FIG. 4. Likewise, the reflection angle of the light beams 124 is different than (e.g., greater than) the reflection angle represented in FIG. 4.

A portion of the build medium 108 that receives the light beams 124 reflecting from the polygon mirror 302 depends on a geometry of portions of the additive manufacturing system 100, such as a number of sides of the polygon mirror 302 and a distance between the polygon mirror 302 and the surface of the build medium 108. In some embodiments, the print head 106 is designed such that the portions of the build medium 108 (e.g., widths) able to receive light beams redirected by a first rotatable reflector and a second rotatable reflector adjacent to the first rotatable reflector include an overlap region able to receive light beams reflected from the first rotatable reflector or the second rotatable reflector.

In the implementation illustrated in FIGS. 3-6, the light beams 124 are configured to perform different functions. For example, the first light beam 304A has characteristics (e.g., power, wavelength, pulse width, duty cycle, etc.) selected to preheat a contacted portion of build medium 108. In this context, preheat refers to heating the contacted portion of the build medium 108 to a temperature that is less than a temperature needed to fuse the build medium 108. Preheating prepares the contacted portion of the build medium 108 for subsequent fusing by another light beam, such as the second light beam 304B. To illustrate, the first light beam 304A heats the contacted portion of the build medium 108 to within a few degrees of a sintering temperature of the build medium 108 or to within a few degrees of the melting temperature of the build medium 108.

Continuing the example above, the second light beam 304B has characteristics (e.g., power, wavelength, pulse width, duty cycle, etc.) selected to fuse a contacted portion of build medium 108. Fusing in this context includes sintering or melting (followed by re-solidifying). The third light beam 304C has characteristics (e.g., power, wavelength, pulse width, duty cycle, etc.) selected to control a cooling rate of the contacted portion of build medium 108. For example, in the absence of the third light beam 304C, fused portions of the build medium 108 cool faster than in the presence of the third light beam 304C. Different material properties are imparted to the objects 102 by preheating and by controlling the rate of cooling of the fused build medium 108. The fourth light beam 304D has characteristics (e.g., power, wavelength, pulse width, duty cycle, etc.) selected to vaporize a contacted portion of build medium 108. For example, the fourth light beam 304D is used to trim edges or openings of the objects 102 to reduce or eliminate post processing.

Figure 7:
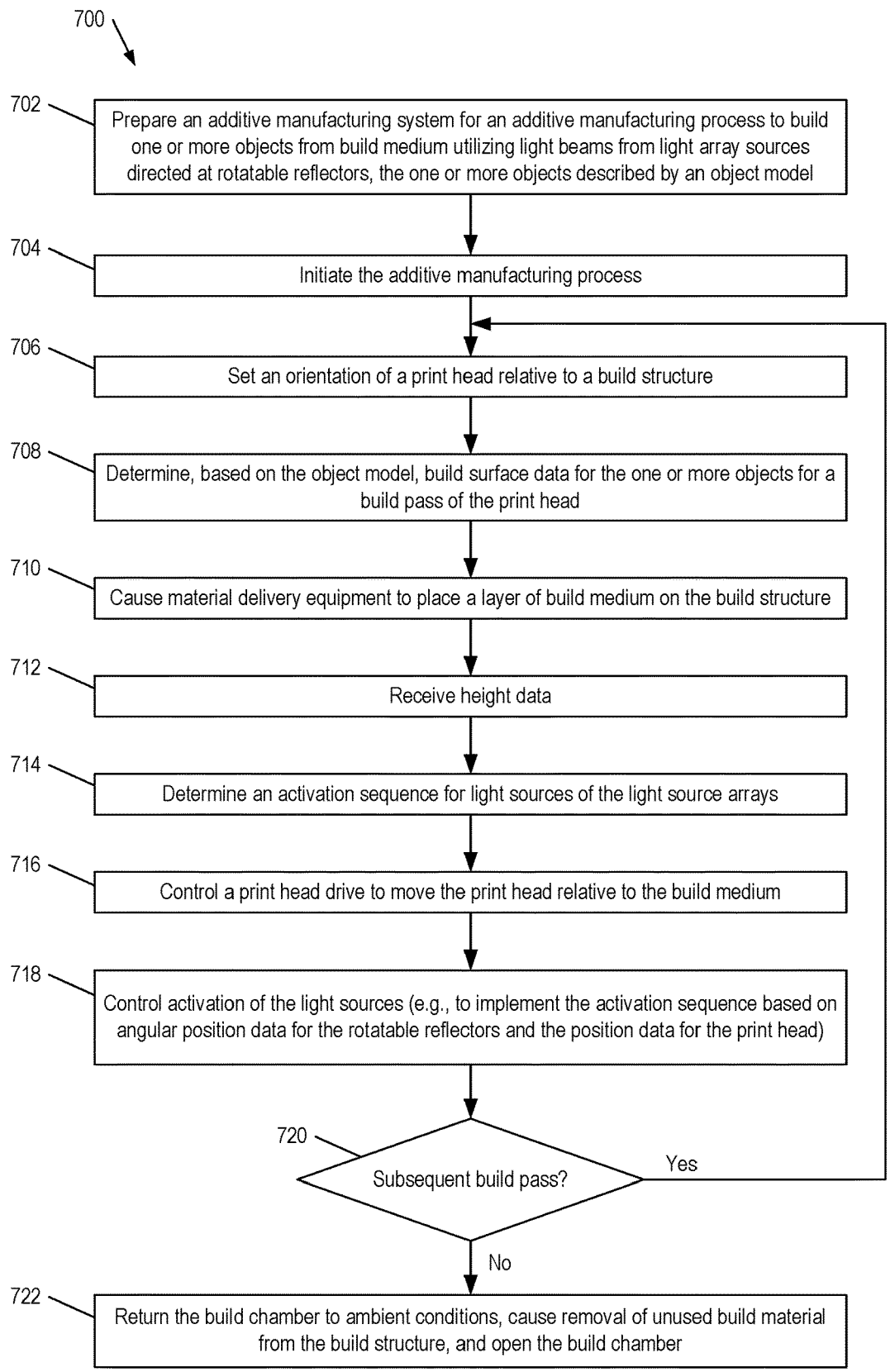
FIG. 7 is a flow chart illustrating an example of a method of additive manufacture of one or more objects.

FIG. 7 is a flow chart illustrating an example of a method 700 of additive manufacture of one or more objects. The method 700 is be initiated, controlled, or performed by the controller 110 of the additive manufacturing system 100 of FIG. 1 or FIG. 2. The method 700 includes, at 702, preparing the additive manufacturing system for an additive manufacturing process. As described with reference to FIG. 1, the additive manufacturing process builds one or more objects 102 from the build medium 108 on the build structure 118 utilizing the light beams 124 from the light source arrays 120 directed at the rotatable reflectors 134. The one or more objects 102 are described by the object model 116.

In a particular implementation, preparing the additive manufacturing system 100 includes providing materials used in the additive manufacturing process (e.g., the build medium 108, one or more environment gases, etc.). Preparing the additive manufacturing system 100 for the additive manufacturing process also includes providing the controller 110 with the object model 116. For example, the controller 110 receives the object model 116 from another computing device via a network or via a portable computer-readable medium. In a particular implementation, the object model 116 includes machine instructions, such as G-code. In another example, the controller 110 determines the machine instructions based on the object model 116. In this example, the object model 116 is a 3D model that the controller 110 uses to generate cross-sectional representations (e.g. slices) of layers of the objects 102 so that the additive manufacturing system 100 forms the layers in the build medium 108 by fusing targeted portions of the build medium 108 to form surfaces corresponding to the cross-sectional representations.

In FIG. 7, the method 700 also includes, at 704, initiating the additive manufacturing process. Initiating the additive manufacturing process includes, for example, closing the build chamber 104, receiving user input to initiate the additive manufacturing process, providing power to components of the additive manufacturing system 100, establishing environmental conditions (e.g., a temperature profile, a pressure profile, an atmosphere composition profile, etc.) in the build chamber 104, calibrating or homing movable components of the additive manufacturing system 100 (such as the print head 106, the rotatable reflectors 134, the material system head 122, the build structure 118, etc.), or combinations thereof. In some implementations, the controller 110 automatically initiates the additive manufacturing process responsive to receiving the object model 116.

In FIG. 7, the method 700 includes, at 706, setting an orientation of a print head relative to a build structure. For example, in implementations in which the print head 106 or the build structure 118 is movable (e.g., via the orientation drive 126), the relative orientation of the print head 106 and the build structure 118 is set. In some implementations, setting the orientation of the print head 106 relative to the build structure 118 includes selecting a particular print head 106 from among a plurality of print heads 106 to be used during a particular portion of the additive manufacturing process. Setting the orientation of the print head 106 relative to the build structure 118 also, or in the alternative, includes moving the print head 106 to an initial position, positioning the light source arrays 120 in working relation to the print head 106, or combinations thereof. In some implementations, the orientation of the print head 106 relative to the build structure 118 is fixed and the operation of setting the orientation of the print head 106 relative to the build structure 118, at 706, is omitted from the method 700.

In FIG. 7, the method 700 includes, at 708, determining, based on the object model 116, build surface data for the one or more objects for a build pass of the print head 106. For example, the controller 110 executes a slicer application to define individual layers from the object model 116. The individual layers correspond to layers of the build medium 108 to be fused to form the one or more objects 102. In this example, the build surface data corresponds to a particular layer (e.g., a cross-sectional portion) of the one or more objects 102 to be formed in a particular build pass of the print head 106. In some implementations, the object model 116 is received at the controller 110 after another computing device executes a slicer application, in which case the object model 116 indicates the individual layer to be fused to form the one or more objects 102. For example, the object model 116 includes machine instructions to direct operation of components of the additive manufacturing system 100. In such implementations, the operation of determining the build surface data is omitted from the method 700.

The method 700 also includes, at 710, causing the material delivery equipment 140 to place a layer of the build medium on the build structure 118. For example, the material system head 122 moves across the build structure 118 to dispense and level a layer of the build medium 108. In some implementations, the material delivery equipment 140 is coupled to and moves with the print head 106, in which case the print head 106 moves across the build structure 118 to dispense and level the build medium 108.

In FIG. 7, the method 700 includes, at 712, receiving, from one or more sensors, height data indicating a distance between the print head 106 and an upper surface of the build medium 108. The height data is used by the controller 110 to cause the build structure 118, the print head 106, or both, to be moved to maintain a consistent distance between the print head 106 and the upper surface of the build medium 108. Alternatively, the controller 110 uses the height data to predict the path that each light beam 124 will travel and uses the predicted paths to control the light source arrays 120, the print head drive 128, the rotatable reflectors 134, or other components of the additive manufacturing system 100. In some implementations, the controller 110 includes information about the build medium 108, the material delivery equipment 140, or both, that enables the controller 110 to maintain a consistent distance between the print head 106 and the upper surface of the build medium 108 without the height data. For example, the controller 110 includes calibration data indicating the thickness of a layer of the build medium 108 that the material delivery equipment 140 applies. In this example, the distance between the print head 106 and the upper surface of the build medium 108 is adjusted for each layer of the build medium 108 applied without receiving the height data.

In FIG. 7, the method 700 includes, at 714, determining, based on the build surface data, an activation sequence for the light sources 246 of the light source arrays 120 to form a portion of (e.g., a layer of) the one or more objects 102. The activation sequence for the light sources 246 is determined based on one or more of: the position of the print head 106 (e.g., an offset distance from a home position), physical properties (e.g., melt temperature or sinter temperature, heat transfer properties, etc.) of the build material, physical properties (e.g., heat transfer properties) of the one or more objects 102, characteristics of the light beam 124 produced by each light source 246, angular positions of the rotatable reflectors 134, the locations of portions of the build medium 108 to be fused, etc. In some implementations, the object model 116 includes machine instructions that specify the activation sequence for the light sources 246, in which case the operation of determining the activation sequence for the light sources 246 is be omitted from the method 700.

The method 700 also includes, at 716, controlling the print head drive 128 to move the print head 106 relative to the build medium 108. In some implementations, the controller 110 receives feedback data as the print head 106 moves. For example, the feedback data includes angular position data for the rotatable reflectors 134, position data for the print head 106, or both. In other implementations, the controller 110 determines (or estimates) the position of the print head 106, the angular positions of the rotatable reflectors 134, or both, based on respective control signals sent by the controller 110 to the print head drive 128, the rotatable reflectors 134, or both. For example, the print head drive 128 includes a stepper motor that moves the print head 106 by a calibrated distance responsive to a control signal. In this example, the controller 110 estimates or calculates the position of the print head 106 based on calibration data (indicating the calibrated distance) and control signals sent to the print head drive 128 after the print head 106 was last detected at a home position. The controller 110 performs a similar process to estimate the angular position of each of the rotatable reflectors 134.

The method 700 also includes, at 718, controlling activation of the light sources 246 (e.g., to implement the activation sequence of the light sources 246 during a build pass of the print head 106). For example, each light source 246 of each light source array 120 is independently controlled, based on the activation sequence to direct a light beam 304 at a targeted portion of the build medium 108. The light sources 246 of each light source array 120 are controlled to direct light beams 124 at the rotatable reflectors 134 as the print head 106 moves. The rotatable reflectors 134 reflect the light beams 124 toward the build medium 108 to selectively contact the build medium 108 to form a portion (e.g., a layer) of the one or more objects 102 from the build medium 108. Each light source array 120 is able to concurrently or simultaneously direct multiple light beams 124 at a respective rotatable reflector 134. To illustrate, in the example of FIG. 3, the light beams 124 from a single light source array 120 include four distinct light beams 304A-304D at one or more times during operation. At other times, the same light source array 120 directs more than four light beams 304 or fewer than four light beams 304.

After the print head 106 completes a build pass, the print head 106 is returned to a home position to prepare for another build pass, or the print head 106 is used to perform another build pass while moving back toward the home position (e.g., using a second set of light source arrays or by changing the position of the light source arrays relative to the rotatable reflectors). The method 700 includes, after a build pass, determining whether a subsequent build pass is to be performed, at 720. If a subsequent build pass is to be performed, one or more of the prior described operations is repeated for the subsequent build pass. For example, in FIG. 7, when a subsequent build pass is to be performed, the method 700 returns to 706 to set the orientation of the print head 106 to be used in the subsequent build pass. In another implementation, the method 700 returns to 710 to cause another layer of the build medium 108 to be applied.

In some implementations, when no subsequent pass is to be performed, the method 700 ends. In the implementation illustrated in FIG. 7, when no subsequent pass is to be performed, the method 700 includes, at 722, performing one or more operations to reset the additive manufacturing system 100, such as returning the build chamber to ambient conditions, causing removal of unused portions of the build medium 108, or other operations to prepare the build chamber 104 to be accessed and used again. In some implementations, the build chamber 104 is secured (e.g., locked or latched) during operation, in which case the method 700 also includes opening the build chamber 104 to enable an operator of the additive manufacturing system 100 to access the build chamber 104 and remove the one or more objects 102.

Figure 8:
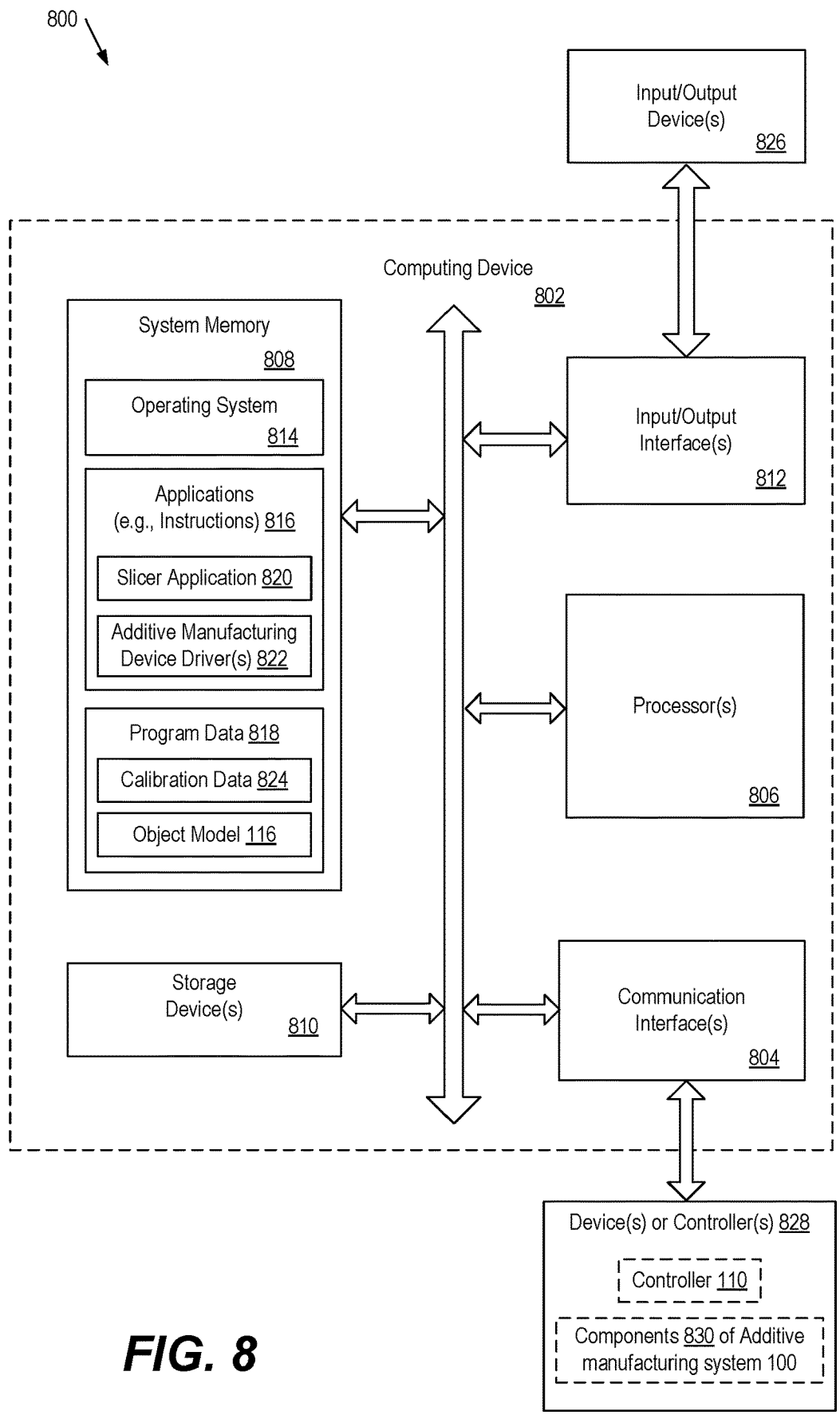
FIG. 8 is a block diagram that illustrates a particular implementation of a computing device configured to initiate, perform, or control one or more operations of an additive manufacturing process.

FIG. 8 is a block diagram of a computing system 800. The computing system 800 can include, be included within, or be coupled to the additive manufacturing system 100. For example, the computing system 800 includes a computing device 802 which corresponds to the controller 110 of FIG. 1. Alternatively, the computing device 802 is coupled to or communicates with the controller 110 via one or more communication interfaces 804. In other implementations, one or more components or subsystems of the additive manufacturing system 100 includes a sub-controller (not shown), which includes or correspond to the computing device 802. For example, one or more computing devices 802 are included in the print head 106, the environment equipment 112, the material processing equipment 114, the material system head 122, the material delivery equipment 140, the material removal equipment 142, or combinations thereof.

The computing device 802 includes one or more processors 806. Within the computing device 802, the one or more processors 806 communicate with a system memory 808, one or more storage devices 810, one or more input/output interfaces 812, the one or more communication interfaces 804, or a combination thereof.

The system memory 808 includes non-transitory computer-readable media implemented as physical devices, and is not merely a signal (or signals) without an associated physical device. The system memory 808 includes volatile memory devices (e.g., random access memory (RAM) devices), nonvolatile memory devices (e.g., read-only memory (ROM) devices, programmable read-only memory, and flash memory), or both. The system memory 808 includes an operating system 814, which in some implementations includes a basic input/output system for booting the computing device 802 as well as a full operating system to enable the computing device 802 to interact with users, other programs, and other devices. The system memory 808 also includes one or more applications 816 (e.g., instructions) and program data 818. The program data 818 includes data used by the applications 816 to perform respective functions of the applications 816.

In the example illustrated in FIG. 8, the applications 816 include a slicer application 820, which is executable by the one or more processors 806 to process the object model 116 to generate individual layers (or slices). The individual layers correspond to cross-sections of the object model 116 and are to guide operation of the additive manufacturing system 100 as it builds the one or more objects 102 using a layer-by-layer additive manufacturing process.

In FIG. 8, the applications 816 also include one or more additive manufacturing device drivers 822, which include instructions executable by the one or more processors 806 to control operation of components of the additive manufacturing system 100. In some implementations, the one or more additive manufacturing device drivers 822 are executable to send control signals directly to individual components or sub-systems of the additive manufacturing system 100. In other implementations, the one or more additive manufacturing device drivers 822 are executable to generate machine instructions (e.g., G-code) and to send the machine instructions to the controller 110 of the additive manufacturing system 100.

In FIG. 8, the program data 818 includes the object model 116 and calibration data 824. The calibration data 824 is used to control the additive manufacturing process. For example, the calibration data 824 is used to determine a portion of the build medium 108 that will be illuminated by a particular light beam 304 based on a position of the print head 106 and an angular position of a particular rotatable reflector 134. In other examples, the calibration data 824 indicates the thickness of a layer of the build medium 108 applied by the material system head 122, operational parameters associated with one or more of the light sources 246 (e.g., parameters indicating a pulse width or duty cycle to be used), etc.

The one or more storage devices 810 include nonvolatile storage devices, such as magnetic disks, optical disks, flash memory devices, or combinations thereof. In some implementations, the one or more storage devices 810 include both removable and non-removable memory devices. In a particular implementation, the one or more storage devices 810 are configured to store the operating system 814, the applications 816, the program data 818, or a combination thereof.

In a particular implementation, the one or more processors 806 are configured to execute instructions, such as the applications 816, stored at the system memory 808. The instructions are executable to cause the one or more processors 806 to perform various operations. For example, in an implementation in which the computer device 802 corresponds to the controller 110, the operations include, but are not limited to: controlling the print head drive 128 to move the print head 106 relative to the build structure 118, controlling one or more rotatable reflectors 134 to redirect multiple light beams 124 to the build medium, controlling activation of, operation of, or activation and operation of, light sources 246 of a plurality of light source arrays 120, etc.

The one or more input/output interfaces 812 enable the computing device 802 to communicate with one or more input/output devices 826 to facilitate user interaction. For example, the one or more input/output interfaces 812 are adapted to receive input from a user, to receive input from another computing device, or a combination thereof. In some implementations, the input/output interfaces 812 conform to one or more standard interface protocols, including serial interfaces (e.g., universal serial bus (USB) interfaces or Institute of Electrical and Electronics Engineers (IEEE) interface standards), parallel interfaces, display adapters, audio adapters, custom interfaces, or combinations thereof. In some implementations, the input/output devices 826 include user interface devices and displays, including some combination of buttons, keyboards, pointing devices, displays, speakers, microphones, touch screens, and other devices. In some implementations, the one or more processors 806 detect interaction events based on user input received via the input/output interfaces 812. Additionally, in some implementations, the one or more processors 806 send a display to a display device via the input/output interfaces 812.

The one or more communication interfaces 804 enable the computing device 802 to communicate with one or more other computing devices or controllers 828. For example, in implementations in which the computing device 802 corresponds to the controller 110, the one or more communication interfaces 804 enable the controller 110 to communicate with other components 830 of additive manufacturing system 100. As another example, in implementations in which the computing device 802 is distinct from and coupled to the controller 110, the one or more communication interfaces 804 enable the computing device 802 to communicate with the controller 110.

The one or more communication interfaces 804 can include wired Ethernet interfaces, IEEE 802 wireless interfaces, Bluetooth communication interfaces, electrical (or power line) interfaces, optical or radio frequency interfaces, or other wired interfaces, other wireless interfaces, or combinations thereof. The other computer devices or controllers 828 can include the controller 110, the other components 826 of the additive manufacturing system 100, host computers, servers, workstations, portable computers, telephones, tablet computers, or any other communication device or component, as non-limiting examples.

Although one or more of FIGS. 1-8 may illustrate systems, apparatuses, and/or methods according to the teachings of the disclosure, the disclosure is not limited to these illustrated systems, apparatuses, and/or methods. One or more functions or components of any of FIGS. 1-8 as illustrated or described herein may be combined with one or more other portions of another of FIGS. 1-8. Accordingly, no single implementation described herein should be construed as limiting and implementations of the disclosure may be suitably combined without departing form the teachings of the disclosure. As an example, one or more operations described with reference to FIG. 7 may be optional, may be performed at least partially concurrently with another operation, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An additive manufacturing system comprising:
a print head comprising a first rotatable reflector and a second rotatable reflector, wherein the first rotatable reflector has a first width and the second rotatable reflector has a second width;
a first light source array configured to direct multiple first light beams onto a build medium via the first rotatable reflector during a build pass, wherein the multiple first light beams include a first heating beam directed to the build medium from a first portion of the first rotatable reflector that corresponds to a first region of the first width, wherein the first heating beam generates first fused build medium, wherein the multiple first light beams include a first trim beam directed toward the build medium from a second portion of the first rotatable reflector that corresponds to a second region of the first width that is offset a first lateral distance from the first region of the first width, and wherein the first trim beam trims the first fused build medium;
a second light source array configured to direct multiple second light beams onto the build medium via the second rotatable reflector during the build pass simultaneously with the multiple first light beams directed onto the build medium via the first rotatable reflector, wherein the multiple second light beams include a second heating beam directed to the build medium from a first portion of the second rotatable reflector that corresponds to a first region of the second width, wherein the second heating beam generates second fused build medium, wherein the multiple second light beams include a second trim beam directed toward the build medium from a second portion of the second rotatable reflector that corresponds to a second region of the second width that is offset a second lateral distance from the first region of the second width, and wherein the second trim beam trims the second fused build medium; and
a controller coupled to the print head, the first light source array, and the second light source array, the controller configured to control activation of the first light beams and activation of the second light beams to form one or more objects from the build medium by selective fusion of portions of the build medium due to contact of the portions with the first light beams, the second light beams, or both.

2. The additive manufacturing system of claim 1, wherein the first light source array includes multiple, independently controllable light sources.

3. The additive manufacturing system of claim 1, wherein the first trim beam vaporizes the first fused build medium and the second trim beam vaporizes the second fused build medium.

4. The additive manufacturing system of claim 1, further comprising a second print head coupled to the controller and moveable with respect to the build medium, the second print head in working relation to a set of light source arrays coupled to the controller.

5. The additive manufacturing system of claim 1, further comprising an orientation drive coupled to the controller and to a build structure that supports the build medium, wherein the controller is configured to send a command to the orientation drive to rotate the build structure to change a direction of movement of the print head with respect to the build structure.

6. The additive manufacturing system of claim 1, further comprising an orientation drive coupled to the print head and the controller, wherein the controller is configured to send a command to the orientation drive to adjust an orientation of the print head relative to a build structure that supports the build medium to change a direction of movement of the print head with respect to the build medium.

7. The additive manufacturing system of claim 1, wherein the first light source array and the second light source array do not move with the print head when the print head moves relative to the build medium.

8. The additive manufacturing system of claim 1, wherein the first light source array and the second light source array move with the print head when the print head moves relative to the build medium.

9. The additive manufacturing system of claim 1, wherein the first rotatable reflector is configured to redirect the first light beams toward the build medium in a first path, and wherein the second rotatable reflector is configured to redirect the second light beams toward the build medium in a second path.

10. The additive manufacturing system of claim 9, wherein a portion of the first path overlaps a portion of the second path.

11. A system for additive manufacturing, the system comprising:
a print head configured to move with respect to a build structure;
rotatable reflectors coupled to the print head, wherein each rotatable reflector has a width;
light source arrays, each light source array in working relation with a respective rotatable reflector of the rotatable reflectors and configured to direct light beams at the respective rotatable reflector during a build pass, wherein the light source arrays and the rotatable reflectors are configured to simultaneously redirect light beams from a plurality of the light source arrays onto a build medium on the build structure during the build pass, wherein the light beams from a light source array of the plurality of the light source arrays comprise a heating beam directed to the build medium from a first portion of the rotatable reflector that corresponds to a first region of the width, wherein the heating beam generates fused build medium, wherein the light beams comprise a trim beam directed toward the build medium from a second portion of the rotatable reflector that corresponds to a second region of the width that is offset a lateral distance from the first region of the width, and wherein the trim beam trims the fused build medium; and
a controller coupled to the print head, to each light source array, and to the rotatable reflectors, wherein the controller is configured to control application of light beams from the light source arrays onto the build medium via the rotatable reflectors to control formation of one or more objects from the build medium by selective fusion of portions of the build medium due to contact of the portions with the light beams.

12. The system of claim 11, further comprising an orientation drive coupled to the controller, wherein the orientation drive is configured to change an orientation of the print head relative to the build structure.

13. The system of claim 11, wherein the rotatable reflectors include polygon mirrors.

14. The system of claim 11, wherein each of the light source arrays includes multiple independently controllable light sources.

15. A method of additive manufacturing, the method comprising:
controlling, via a controller, a print head drive to move a print head relative to a build structure, wherein the print head includes rotatable reflectors, each rotatable reflector having a width, and each rotatable reflector configured to redirect multiple light beams directed at the rotatable reflector onto a build medium on the build structure during a build pass; and
controlling, via the controller, activation of light source arrays to direct light beams at the rotatable reflectors as the print head moves during the build pass, wherein each light source array is configured to direct a plurality of light beams at a respective rotatable reflector of the rotatable reflectors, wherein the plurality of light beams directed at a first rotatable reflector of the rotatable reflectors comprises a heating beam directed to the build medium from a first portion of the first rotatable reflector that corresponds to a first region of the width, wherein the heating beam generates fused build medium, wherein the plurality of light beams comprises a trim beam directed toward the build medium from a second portion of the first rotatable reflector that corresponds to a second region of the width that is offset a first lateral distance from the first region of the width, wherein the first trim beam trims the fused build medium, wherein the light source arrays and the rotatable reflectors are configured to simultaneously redirect light beams from a plurality of the light source arrays onto the build medium, and wherein the rotatable reflectors reflect the light beams onto the build medium to form one or more objects from the build medium by selective fusion of portions of the build medium due to contact of the portions with the light beams.

16. The method of claim 15, wherein a particular light source array includes multiple light sources, and wherein controlling the particular light source array to direct the light beams at a rotatable reflector as the print head moves includes selectively activating a particular light source of the multiple light sources to fuse a portion of the build medium.

17. The method of claim 16, wherein controlling the particular light source array to direct the light beams at the rotatable reflector as the print head moves further includes selectively activating another particular light source of the multiple light sources to preheat the portion of the build medium before the portion of the build medium is fused.

18. The method of claim 16, wherein controlling the particular light source array to direct the light beams at the rotatable reflector as the print head moves further includes selectively activating another particular light source of the multiple light sources to control a rate of cooling of the portion of the build medium after the portion of the build medium is fused.

19. The method of claim 15, further comprising engaging an orientation drive to change an orientation of the print head relative to the build medium.

20. The method of claim 15, further comprising:
determining an activation sequence for light sources of the light source arrays based on build surface data for the one or more objects;
receiving position data that indicates a position of the print head relative to the build medium; and
receiving angular position data for the rotatable reflectors, wherein controlling activation of the light source arrays includes implementing the activation sequence based on the position data and the angular position data.

21. An additive manufacturing system, the additive manufacturing system comprising:
a first print head configured to move in a first direction with respect to a build structure;
a plurality of first rotatable reflectors coupled to the first print head, each rotatable reflector of the plurality of first rotatable reflectors configured to redirect light beams directed at the rotatable reflector across a build medium on the build structure during a build pass;
a plurality of light source arrays, each light source array associated with a corresponding reflector of the plurality of first rotatable reflectors and each light source array of the plurality of light source arrays having light sources, wherein a first light source array of the plurality of light source arrays is configured to direct light beams from the light sources at a first rotatable reflector of the plurality of first rotatable reflectors, wherein the light beams include a heating beam directed to the build medium from a first portion of the first rotatable reflector that corresponds to a first region of a width of the first rotatable reflector, wherein the heating beam generates fused build medium, wherein the light beams include a trim beam directed toward the build medium from a second portion of the first rotatable reflector that corresponds to a second region of the width that is offset a first lateral distance from the first region of the width, and wherein the first trim beam trims the fused build medium; and
a controller coupled to the first print head and coupled to the plurality of light source arrays, the controller configured to control application of light beams from the plurality of light source arrays onto the build medium via the plurality of first rotatable reflectors during the build pass to control formation of one or more objects from the build medium by selective fusion of portions of the build medium due to contact of the portions with the light beams.

22. The additive manufacturing system of claim 21, further comprising a second print head having at least one rotatable reflector, the second print head configured to move in a second direction relative to the build structure, the second direction different than the first direction, wherein the plurality of light source arrays is movable from a first position in working relation to the plurality of first rotatable reflectors to a second position in working relation to the at least one rotatable reflector.

* * * * *